United States Patent
Yang et al.

(10) Patent No.: US 10,945,163 B2
(45) Date of Patent: Mar. 9, 2021

(54) METHOD AND SYSTEM TO PROVIDE MISSION CRITICAL TALKGROUP SERVICE WITH MINIMAL AUDIO TRUNCATION AND DELAY

(71) Applicant: MOTOROLA SOLUTIONS, INC, Chicago, IL (US)

(72) Inventors: Yunhai Yang, Elgin, IL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/175,888

(22) Filed: Oct. 31, 2018

(65) Prior Publication Data
US 2020/0137636 A1    Apr. 30, 2020

(51) Int. Cl.
| | |
|---|---|
| H04W 36/00 | (2009.01) |
| H04W 4/08 | (2009.01) |
| H04W 4/10 | (2009.01) |
| H04W 76/45 | (2018.01) |
| H04W 52/02 | (2009.01) |
| H04W 8/18 | (2009.01) |
| H04W 36/24 | (2009.01) |
| H04W 36/32 | (2009.01) |
| H04W 76/27 | (2018.01) |
| H04W 84/08 | (2009.01) |

(52) U.S. Cl.
CPC ......... *H04W 36/0009* (2018.08); *H04W 4/08* (2013.01); *H04W 4/10* (2013.01); *H04W 8/186* (2013.01); *H04W 36/245* (2013.01); *H04W 36/32* (2013.01); *H04W 52/0212* (2013.01); *H04W 76/27* (2018.02); *H04W 76/45* (2018.02); *H04W 84/08* (2013.01)

(58) Field of Classification Search
CPC .......... H04W 36/0009; H04W 36/245; H04W 36/32; H04W 4/08; H04W 4/10; H04W 76/45; H04W 76/27; H04W 52/0212; H04W 8/186; H04W 84/08
See application file for complete search history.

(56) References Cited

U.S. PATENT DOCUMENTS

| | | | |
|---|---|---|---|
| 7,328,035 B2 | 2/2008 | Kelley et al. | |
| 7,570,975 B2 | 8/2009 | Oprescu-Surcobe et al. | |
| 8,478,261 B2 | 7/2013 | Vempati et al. | |
| (Continued) | | | |

FOREIGN PATENT DOCUMENTS

GB    2420252 A    11/2004

*Primary Examiner* — Jianye Wu
(74) *Attorney, Agent, or Firm* — John B. MacIntyre; Barbara R. Doutre

(57) ABSTRACT

A method and subscriber unit provide mission critical talkgroup service while minimizing truncation and delay when at least one member talkgroup radio is on a Broadband LTE (Long Term Evolution) system. A dual-mode subscriber unit preferably obtains LMR coverage map data to predict the entry point and remaining duration for when the subscriber unit will operate in the backup LTE system. The subscriber unit falls back to the LTE system when the subscriber unit is out of the coverage area of the LMR system. Because the subscriber unit set the connected state prior to using the LTE network and continuously optimizes RRC mode parameters, audio truncation and call delay are greatly reduced without draining the battery of the subscriber unit.

20 Claims, 4 Drawing Sheets

(56) References Cited

U.S. PATENT DOCUMENTS

| | | |
|---|---|---|
| 8,923,895 B2 | 12/2014 | Santhanam et al. |
| 9,363,772 B2 | 6/2016 | Burks |
| 9,661,611 B2 | 5/2017 | Islam et al. |
| 9,763,172 B2 | 9/2017 | Vajapeyam et al. |
| 2012/0282968 A1* | 11/2012 | Toskala ................ H04W 24/10 |
| | | 455/517 |
| 2014/0066118 A1 | 3/2014 | Pai |
| 2014/0179293 A1* | 6/2014 | Li .......................... H04W 4/16 |
| | | 455/416 |
| 2014/0187280 A1* | 7/2014 | Bekiares ................ H04W 4/08 |
| | | 455/519 |
| 2018/0054799 A1 | 2/2018 | Starsinic et al. |
| 2018/0167874 A1 | 6/2018 | Ofir et al. |
| 2018/0203442 A1* | 7/2018 | Kotlyarov |
| 2018/0302296 A1* | 10/2018 | Yu .......................... H04L 41/16 |
| 2019/0104480 A1* | 4/2019 | Hasholzner ........... H04W 52/34 |

\* cited by examiner

METHOD AND SYSTEM TO PROVIDE MISSION CRITICAL TALKGROUP SERVICE WITH MINIMAL AUDIO TRUNCATION AND DELAY

BACKGROUND OF THE INVENTION

The Land Mobile Radio (LMR) Backup-PTT feature enables LMR radios to roam to a Long Term Evolution (LTE) system when LMR coverage is absent in order to maintain group voice services. In LMR communication systems, a mobile device monitors a control channel, for example for group call activity, such as talkgroup calls. For radios that have fallen back to LTE systems, a mobile radio goes to idle state after ten seconds of inactivity.

If there is a new group call started on the talkgroup that the idle radio is monitoring, the radio needs to be paged back to RRC_CONNECTED state first. The paging cycle is typically 1.28 sec. A nationwide page is required if the initial page fails, and it could take up to a couple seconds. In general, the addition of paging time results in audio truncation or throughput delay, which is unacceptable for mission critical use cases.

One workaround to this problem is to keep a radio in the RRC_CONNECTED state all the time to remove the paging needs. However, this method is very battery consumption intensive.

Therefore, a need exists for a method and system to begin talkgroup calls immediately without having audio truncation. Further, a need exists to start talkgroup calls immediately without audio truncation and without draining the batteries of mobile devices that are part of the talkgroup.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
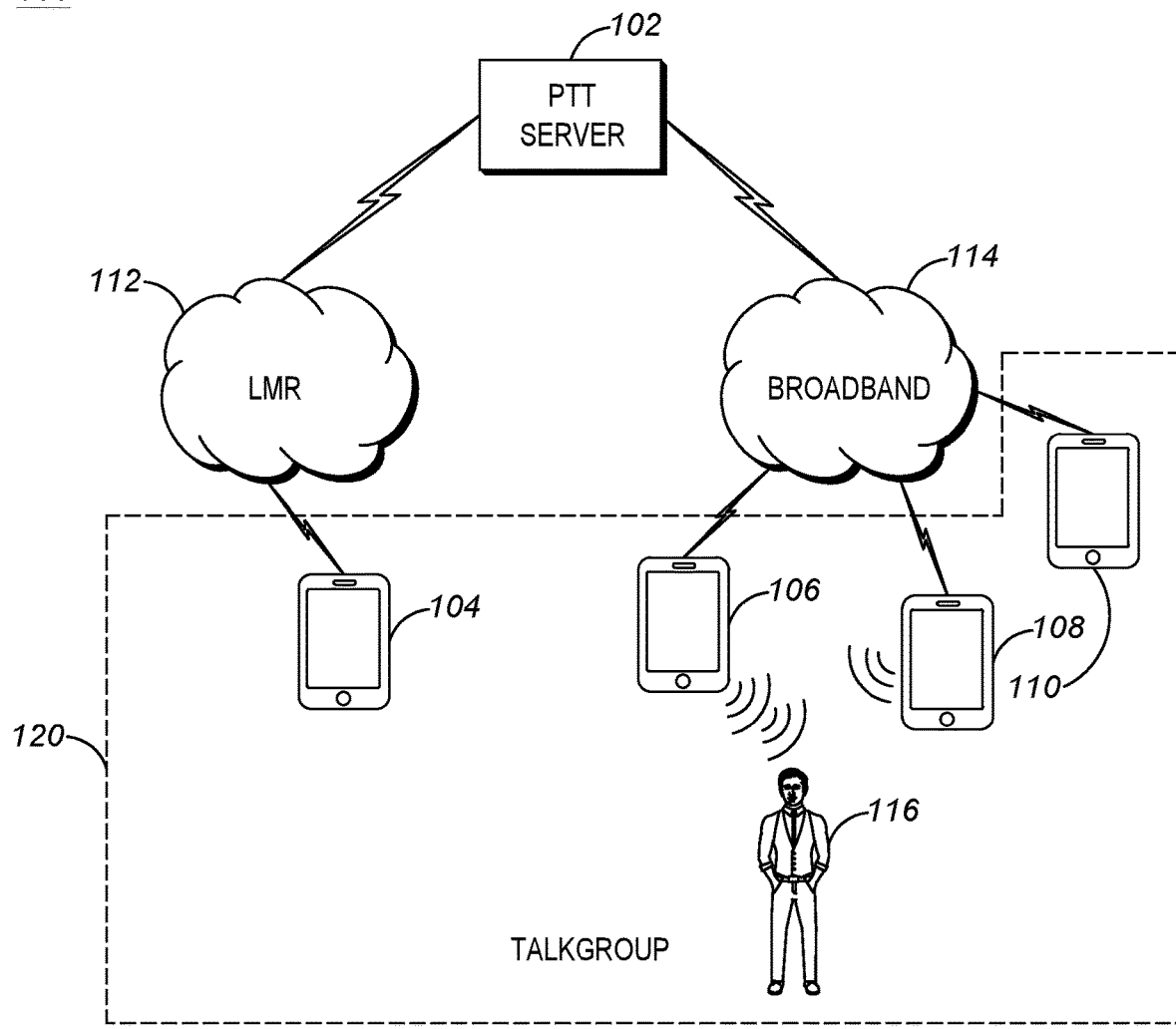
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment provides mission critical talkgroup service while eliminating truncation and delay when at least one member talkgroup radio is on a Broadband LTE (Long Term Evolution) system. A dual-mode subscriber unit preferably uses LMR coverage map data, historically learned route and talkgroup (TG) activities, and real time traffic to predict the entry point and remaining duration for when the subscriber unit will operate in the backup LTE system. The subscriber unit falls back to the LTE system when the subscriber unit is out of the coverage area of the LMR system. Based on this this information, the subscriber unit dynamically sets LTE Radio Resource Control (RRC) mode parameters to balance battery consumption and call responsiveness.

FIG. 1 depicts a system diagram of a communication system 100 in accordance with an exemplary embodiment of the present invention. Communication system 100 preferably includes a PTT server 102, a land mobile radio (LMR) network 112, a broadband network 114, and communication devices 104, 106, 108, and 110. The communication devices 104, 106, 108, and 110 are sometimes referred to as subscriber units. A user 116 of communication device 104 may carry the communication device 104, for example, on a belt or within a pants pocket. Communication devices 104, 106, 108, and 110 additionally form talkgroup 120. In this embodiment, communication device 104 is connected to LMR network 112, while communication devices 106, 108 and 110 are connected to broadband network 114.

PTT server 102 is also communicatively coupled to LMR Network 112 and Broadband Network 114.

FIG. 1 illustrates a graphical representation of an example talkgroup 120 that includes communication devices 104, 106, 108, and 110. Although each communication device 104, 106, 108, and 110 is shown affiliated with talkgroup 120, devices 106, 108, and 110 may be associated with one or more other talkgroups. Talkgroup 120 is merely exemplary and has been simplified for the sake of explanation. In some embodiments, communication system 100 includes more or fewer communication devices and more or fewer talkgroups. In some embodiments, the talkgroups have more or fewer affiliated communication devices. In some embodiments, the talkgroups do not have the same number of affiliated communication devices. While FIG. 1 illustrates four communication devices 104, 106, 108, and 110 for clarity purposes, it should be understood that the methods herein can be used with more or fewer communication devices.

Figure 2:
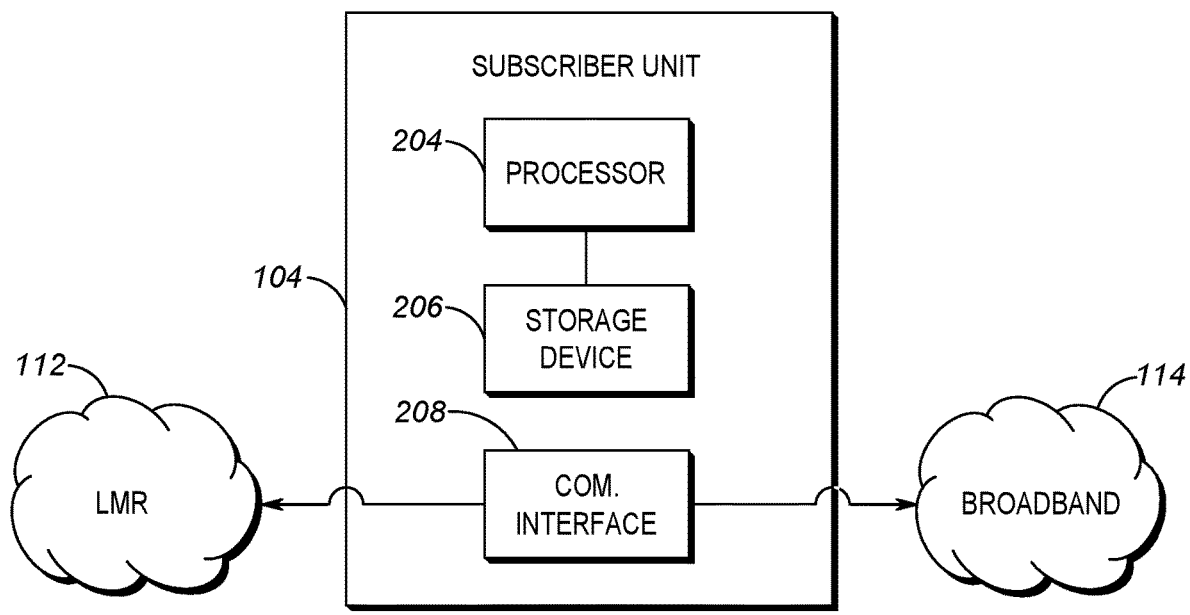
FIG. 2 depicts a schematic of a subscriber unit in accordance with an exemplary embodiment of the present invention.

FIG. 2 schematically illustrates subscriber unit 104 in more detail. In the example provided, subscriber unit 104 includes an electronic processor 204, a storage device 206, and a communication interface 208. Electronic processor 204, storage device 206, and communication interface 208 communicate over one or more communication lines or buses. Wireless connections or a combination of wired and wireless connections are also possible.

Electronic processor 204 may include a microprocessor, application-specific integrated circuit (ASIC), field-programmable gate array, or another suitable electronic device. Electronic processor 204 obtains and provides information (for example, from storage device 206 and/or communication interface 208), and processes the information by executing one or more software instructions or modules, capable of being stored, for example, in a random access memory ("RAM") area of storage device 206 or a read only memory ("ROM") of storage device 206 or another non-transitory computer readable medium (not shown). The software can include firmware, one or more applications, program data, filters, rules, one or more program modules, and other executable instructions. Electronic processor 204 is configured to retrieve from storage device 206 and execute, among other things, software related to the control processes and methods described herein.

Storage device 206 can include one or more non-transitory computer-readable media, and may include a program storage area and a data storage area. The program storage area and the data storage area can include combinations of different types of memory, as described herein. In the embodiment illustrated, storage device 206 stores, among other things, instructions for the processor to carry out the methods of FIGS. 3 and 4.

Communication interface 208 may include a transceiver (for example, an LTE modem, an FM transceiver, or a Wi-Fi or Ethernet transceiver) for communicating over one or more wired or wireless communication networks (for example, the land mobile radio (LMR) network 112 or the broadband network 114) or connections.

Figure 3:
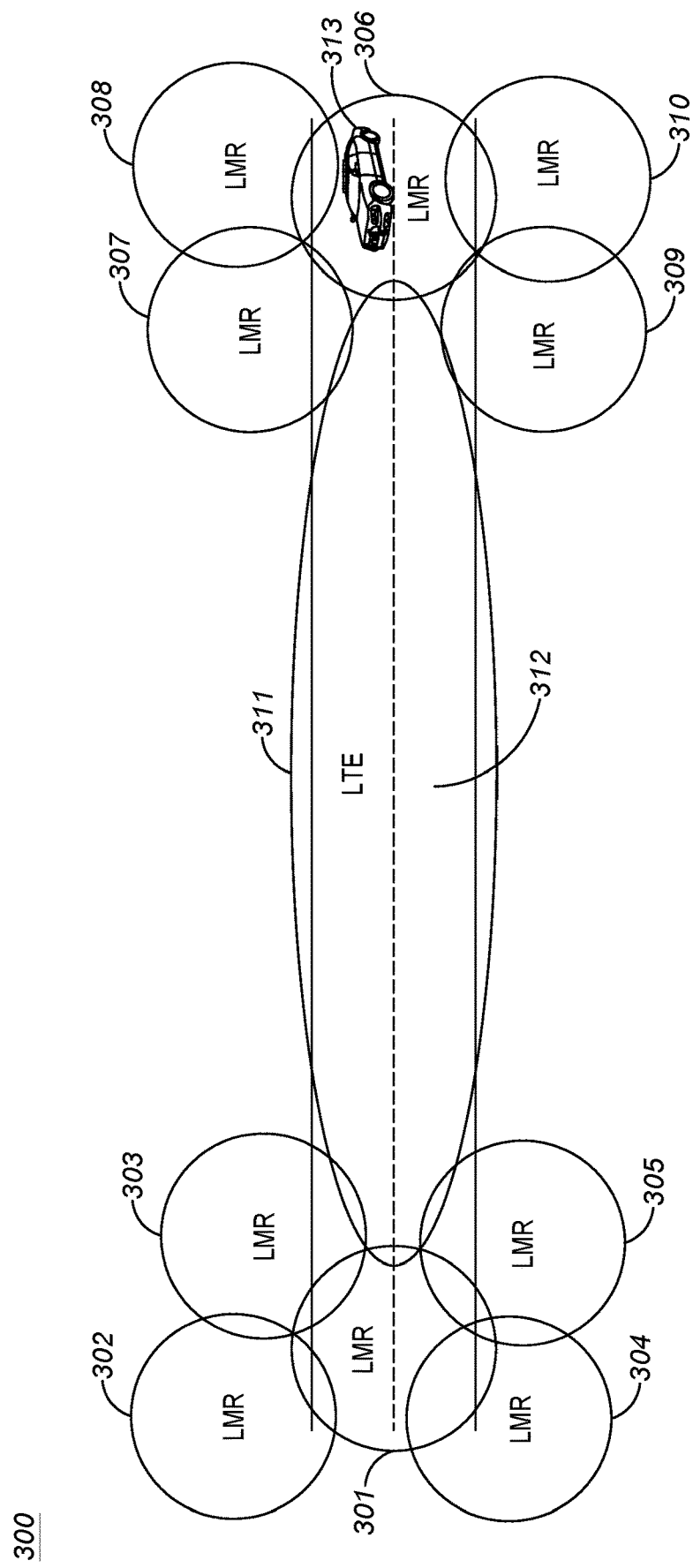
FIG. 3 depicts a diagram of a road and LMR and LTE coverage areas in accordance with an exemplary embodiment of the present invention.

FIG. 3 depicts a diagram of a road 312 and LMR and LTE 301-311 coverage areas in accordance with an exemplary embodiment of the present invention. In accordance with an exemplary embodiment, vehicle 313 drives on road 312 and leaves LMR coverage areas 306-310 and will enter LTE coverage area 311 and begin using the LTE system for voice calls, such as PTT calls.

System 300 includes a plurality of coverage areas 301-311. Each coverage area preferably has a base station associated therewith, but they are not depicted in FIG. 3 for clarity purposes. Coverage areas 301-310 are preferably LMR coverage areas. In this exemplary embodiment, coverage areas provide voice and data service for subscriber unit, such as vehicle 313.

Coverage area 311 depicts an LTE coverage area. In accordance with the exemplary embodiment depicted in FIG. 3, coverage area 311 provides coverage for a large portion of road 312.

Figure 4:
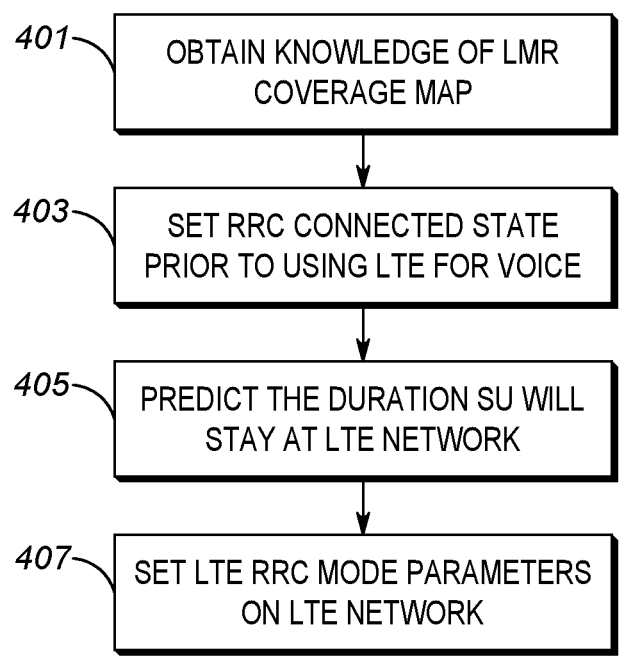
FIG. 4 depicts a flowchart in accordance with an exemplary embodiment of the present invention.

FIG. 4 depicts a flowchart 400 in accordance with an exemplary embodiment of the present invention. In accordance with an exemplary embodiment, provided or learned LMR data is used to set LTE RRC mode parameters. In this manner, the duration of the subscriber unit staying in RRC_CONNECTED state is used to reduce LMR-LTE group call truncation and delay without excessive battery power consumptions.

In accordance with an exemplary embodiment, subscriber unit 104 obtains (401) knowledge of an LMR coverage map. In an exemplary embodiment, subscriber unit 104 uses traces data, which is coverage information that is obtained by all subscriber units in the system and shared back with each subscriber unit, or LMR-LTE mobility data to build the LMR coverage map. In accordance with an alternate exemplary embodiment, the coverage map can be preloaded on the subscriber unit 104 based on the location of subscriber unit 104 or the LMR coverage hole proximity. Subscriber unit 104 preferably stores its daily routes and RF condition changes via distributed learning, where each subscriber unit learns and updates its coverage data.

Subscriber Unit 104 sets (403) the RRC Connected State prior to using LTE for voice. Subscriber Unit 104 is preferably attached to both LMR and LTE systems with all voice calls routed through LMR when available. In this state, subscriber unit 104 is in RRC_IDLE state while using the LMR system for voice services. In accordance with an exemplary embodiment, subscriber unit 104 predicts when it is close to leaving the LMR coverage area. In this scenario, subscriber unit 104 enters an RRC_Connected state in preparation for moving to receiving calls on LTE. By entering an RRC_CONNECTED state prior to actually moving voice service to the LTE system, audio truncation is thereby eliminated or substantially decreased.

Subscriber Unit 104 predicts (405) the duration it will stay at the LTE Network. In an exemplary embodiment, subscriber unit 104 collects information about its moving behavior, including historical moving behaviors, real time moving behavior, such as navigation and speed, an LMR coverage map, historical and real time moving behaviors of subscriber unit 104, and traffic data to predict the duration that subscriber unit 104 would potentially stay in the LTE network.

Subscriber Unit 104 sets (407) LTE RRC Mode parameters on LTE Network. In an exemplary embodiment, the setting of the LTE RRC Mode parameters are based on at least one of a predicted pending loss of coverage on the LMR network, a predicted duration that subscriber unit 104 would potentially stay in the LTE network, and the subscriber unit's battery life, role, incident, and priority of the event. In addition, subscriber unit 104 can utilize an LMR coverage map, historical and real-time moving behaviors of subscriber 104, talkgroup activity statistics over time and event, the battery status of the battery powering subscriber unit 104, the role of a user of subscriber unit 104, incident data, the priority of an event, and/or traffic data. Further, subscriber unit 104 can reevaluate the LTE RRC mode parameters each time subscriber unit 104 wakes up due to a traffic event, such as a location update or a voice call.

The exemplary embodiment depicted in FIG. 4 therefore eliminates or greatly reduces the probability of truncated voice or delaying group calls while having a small impact on battery drainage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
routing all voice calls of a dual-mode subscriber unit, operable in both LMR and LTE networks, through the LMR network when the LMR network is available;
determining that a subscriber unit participating in a talkgroup call will be transitioning from the LMR network to the LTE network;
dynamically setting, by the subscriber unit, LTE RRC (Radio Resource Control) mode parameters, based on LMR data, prior to moving to the LTE network;
entering an RRC connected state prior to using LTE for voice; and
moving voice service to the LTE network while maintaining participation of the subscriber unit in the talkgroup call.

2. The method of claim 1, wherein dynamically setting LTE RRC mode parameters further comprises:
predicting a network duration comprising a duration that the subscriber unit will utilize the LTE network.

3. The method of claim 2, wherein the step of predicting a network duration comprises predicting a network duration using an LMR coverage map.

4. The method of claim 2, wherein the step of predicting a network duration comprises predicting a network duration using historical movements of the subscriber unit.

5. The method of claim 2, predicting a network duration comprises predicting a network duration using real-time movements of the subscriber unit.

6. The method of claim 2, predicting a network duration comprises predicting a network duration using traffic data.

7. The method of claim 1, the method further comprising reevaluating the LTE RRC mode parameters after a wakeup of the subscriber unit.

8. The method of claim 7, wherein the wakeup comprises a traffic event.

9. The method of claim 1, wherein the step of determining that a subscriber unit participating in a talkgroup call will be transitioning from an LMR network to an LTE network comprises determining that a subscriber unit participating in a talkgroup call will be transitioning from an LMR network to an LTE network comprises utilizing subscriber unit parameters.

10. The method of claim 1, wherein the step of determining that a subscriber unit participating in a talkgroup call will be transitioning from an LMR network to an LTE network comprises determining that a subscriber unit participating in a talkgroup call will be transitioning from an LMR network to an LTE network comprises utilizing talkgroup parameters.

11. The method of claim 1, wherein the LTE RRC mode parameters are set using LTE network duration.

12. The method of claim 1, wherein the LTE RRC mode parameters are set using talkgroup parameters.

13. The method of claim 1, wherein the LTE RRC mode parameters are set using subscriber unit parameters.

14. The method of claim 13, wherein the subscriber unit parameters comprise a battery life parameter of the subscriber unit.

15. The method of claim 13, wherein the subscriber unit parameters comprise a role of the subscriber unit.

16. The method of claim 13, wherein the subscriber unit parameters comprise an incident parameter for the subscriber unit.

17. The method of claim 13, wherein the subscriber unit parameters comprise an event priority parameter.

18. The method of claim 1, wherein the step of dynamically setting LTE RRC mode parameters prior to moving to the LTE network comprises dynamically setting LTE RRC mode parameters such that the subscriber unit is active on the LTE network so that there is no audio truncation for the subscriber unit.

19. A subscriber unit comprising:
a communication interface; and
a processor that performs:
- routing all voice calls of a dual-mode subscriber unit, operable in both LMR and LTE networks, through the LMR network when the LMR network is available;
- determining that a subscriber unit participating in a talkgroup call will be transitioning from the LMR network to the LTE network;
- dynamically setting, by the subscriber unit, LTE RRC (Radio Resource Control) mode parameters, based on LMR data, prior to moving to the LTE network;
- entering an RRC connected state prior to using LTE for voice; and
- moving voice service to the LTE network thereby maintaining participation of the subscriber unit in the talkgroup call.

20. The subscriber unit of claim 19, wherein the dynamically setting of LTE RRC mode parameters further comprises:
predicting a network duration comprising a duration that the subscriber unit will utilize the LTE network.

\* \* \* \* \*